(12) United States Patent
Zhang et al.

(10) Patent No.: US 8,874,737 B2
(45) Date of Patent: *Oct. 28, 2014

(54) OFSENSE: LIGHT-WEIGHT NETWORKING SENSING WITH OPENFLOW

(75) Inventors: Yueping Zhang, Princeton, NJ (US); Vishal Singh, Plainsboro, NJ (US); Ye Wang, Princeton, NJ (US); Guofei Jiang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/554,632

(22) Filed: Jul. 20, 2012

(65) Prior Publication Data

US 2013/0185419 A1 Jul. 18, 2013

Related U.S. Application Data

(60) Provisional application No. 61/510,574, filed on Jul. 22, 2011.

(51) Int. Cl.
*G06F 15/173* (2006.01)
*G06F 15/177* (2006.01)
*H04L 12/26* (2006.01)
*H04L 29/08* (2006.01)
*H04L 12/24* (2006.01)

(52) U.S. Cl.
CPC ............... *H04L 43/04* (2013.01); *H04L 67/36* (2013.01); *H04L 43/08* (2013.01); *H04L 43/045* (2013.01); *H04L 41/142* (2013.01); *H04L 43/0858* (2013.01)
USPC .......................................... 709/224; 709/220

(58) Field of Classification Search
CPC ....... H04L 43/04; H04L 43/045; H04L 43/08; H04L 67/36
USPC ........................................................ 709/224
See application file for complete search history.

(56) References Cited

U.S. PATENT DOCUMENTS

| | | | |
|---|---|---|---|
| 2005/0010571 A1* | 1/2005 | Solotorevsky et al. | ........... 707/5 |
| 2009/0138577 A1* | 5/2009 | Casado et al. | ................ 709/220 |
| 2012/0303835 A1* | 11/2012 | Kempf et al. | ................ 709/235 |

* cited by examiner

*Primary Examiner* — Kevin Bates
*Assistant Examiner* — Emad Siddiqi
(74) *Attorney, Agent, or Firm* — Joseph Kolodka

(57) ABSTRACT

A method for determining the state of an entire network, including state of applications and infrastructure includes receiving network control messages in an OpenFlow network, passing normal network control messages through OFSense, a control plane middleware, and constructing from the network control messages an application level connectivity graph to infer network delay between any two communicating server in the network and estimating an application response time of a given server in the network; and providing state of the network for enabling intelligent detection and diagnosis of infrastructure and application performance.

12 Claims, 4 Drawing Sheets

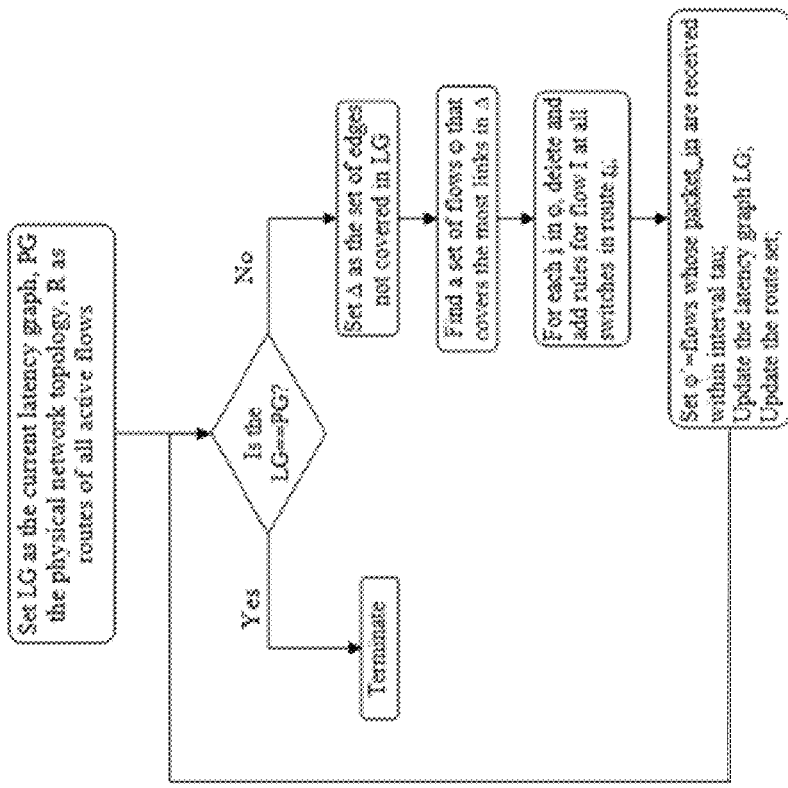
FIG. 7
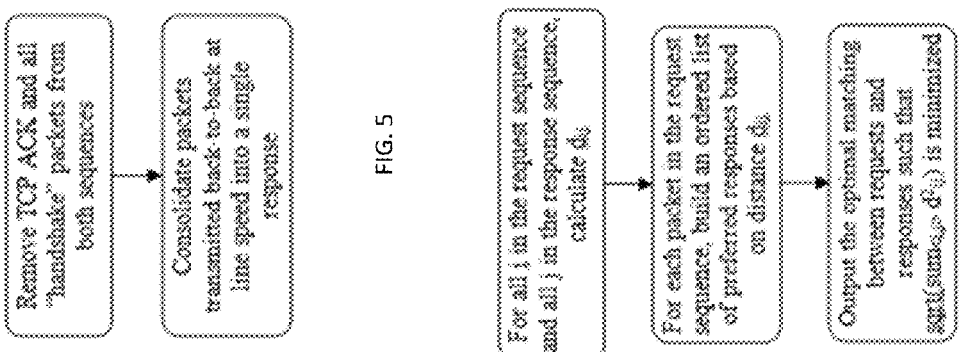
FIG. 5
FIG. 6

OFSENSE: LIGHT-WEIGHT NETWORKING SENSING WITH OPENFLOW

RELATED APPLICATION INFORMATION

This application claims priority to provisional application No. 61/510,574 filed Jul. 22, 2011, the contents thereof are incorporated herein by reference

BACKGROUND OF THE INVENTION

The present invention relates generally to networking, and more particularly, to OFSense: Light Weight Networking Sensing with Openflow.

Modern data centers, with plethora of technologies, devices and large scale growth in the number of applications and their deployments, it becomes imperative that we need a way to determine the state of the entire system using lightweight monitoring. This must include state of applications as well as infrastructure (e.g., network, storage, servers). The present invention builds on the fact that any system behavior deterioration will be observed by the network. However, it is not easy to utilize this as: (a) There is no central point from where such an observation is possible. (b) The amount of traffic going into the network is huge and analyzing such traffic is not scalable. (c) System behavior evolves. In this inventive technique, openflow technology is used try to build smart data center sensing applications thereby addressing (a) and (b) mentioned above.

Existing work can be coarsely classified into three categories: implementation, applications, and value added services. The first class of research work seeks to improve the scalability the OF controller by partitioning and allocating rules to authoritative switches, by introducing parallelism and additional throughput optimizing techniques, and by implementing distributed control plane. The second class of work focus on building other advanced networking devices based on OFS. Specifically, Das et al. apply OFS to construct integrated packet/circuit switching. Sherwood et al. proposed FlowVisor, which allows coexistence between production legacy protocol and new experimental ones and essentially converts a production network into a testbed. Anwer el al. developed SwitchBlade, which is a programmable hardware platform for rapid deployment of custom protocols. The third class of work applies OH to construct other services, such as DDoS detection, traffic matrix computation, dynamic access control, and load balancing.

Accordingly, there is a need for determining the state of an entire network system using lightweight monitoring, which includes state of applications as well as infrastructure (e.g., network, storage, servers).

BRIEF SUMMARY OF THE INVENTION

The present invention is directed a method for determining the state of an entire network, including state of applications and infrastructure includes receiving network control messages in an OpenFlow network, passing normal network control messages through OFSense, a control plane middleware, and constructing from the network control messages an application level connectivity graph to infer network delay between any two communicating server in the network and estimating an application response time of a given server in the network; and providing state of the network for enabling intelligent detection and diagnosis of infrastructure and application performance.

These and other advantages of the invention will be apparent to those of ordinary skill in the art by reference to the following detailed description and the accompanying drawings.

BRIEF DESCRIPTION OF THE DRAWINGS

FIG. 5 shows a flow diagram for preprocessing carried out by Procedure 3: SD (Server Delay), depicted in FIG. 2;

FIG. 6 shows sequence matching steps carried out by procedure 3: SD (Server delay), depicted in FIG. 2;

FIG. 7 shows a flow diagram for Procedure 4: Scheduler, depicted in FIG. 2; and

DETAILED DESCRIPTION

The present invention, OFSense, approaches the problem, determining the state of an entire system, from a unique angle and takes advantage of OFS' special sensing capabilities built upon message exchange in its control plane. Specifically, OFSense leverages the Packet_In events to construct an application level connectivity graph, to infer network delay between any two communicating server pair, and to estimate the application response time of a given server. To provide a temporal view the system evolution trajectory, OFSense also employs a novel algorithm that enables on-demand network sensing with minimal overhead and interference with existing applications. Using OFSense, the network operator is able to perform intelligent detection and diagnosis of application performance.

Figure 1:
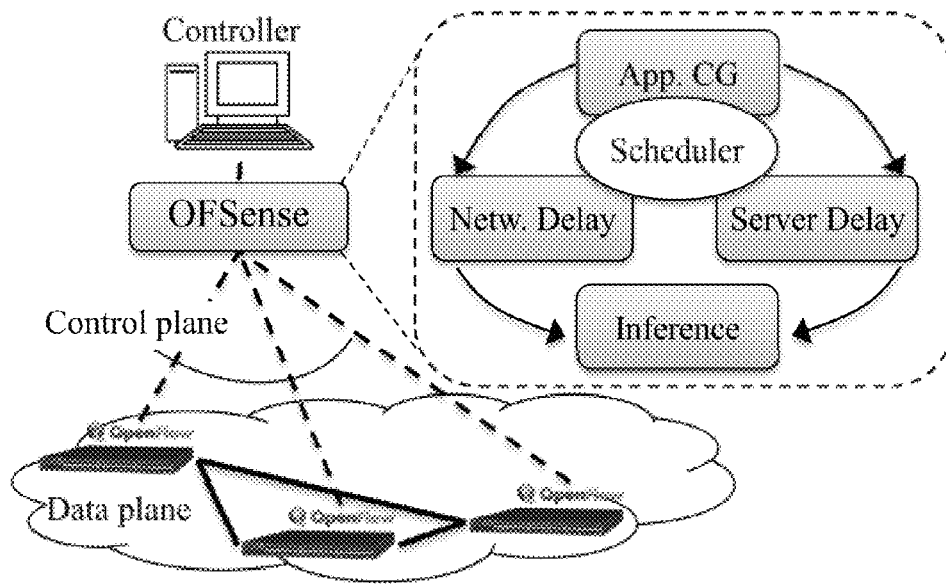
FIG. 1 is a diagram depicting an exemplary architecture in which OFSense is deployed, in accordance with the invention.
Figure 2:
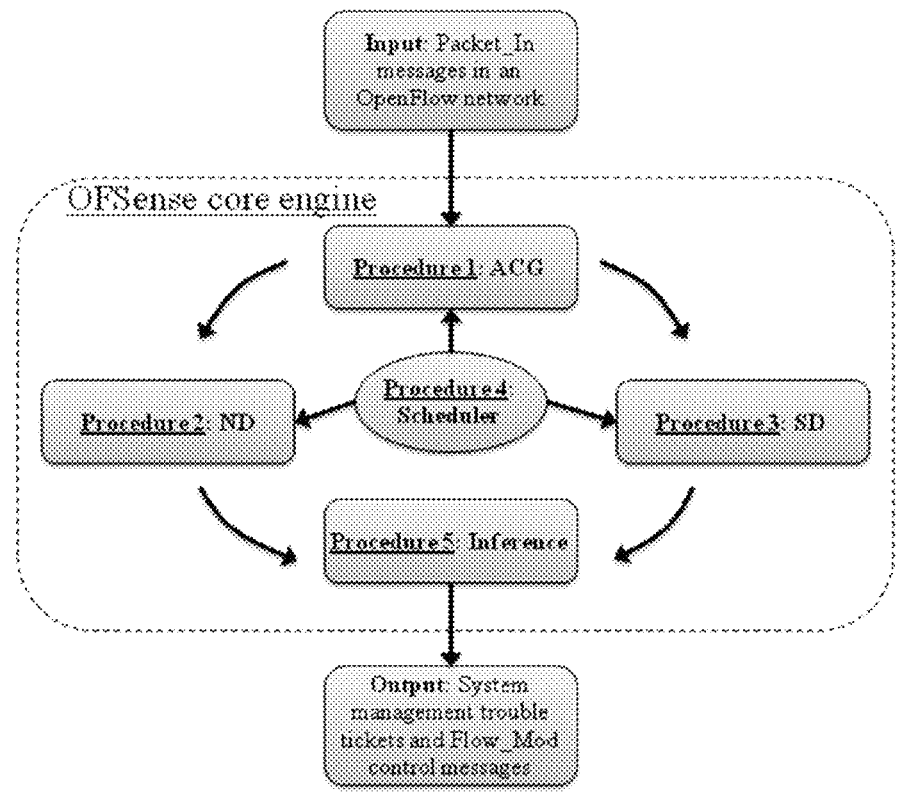
FIG. 2 is a flow chart mapping the system architecture of FIG. 1, in accordance with the invention.

Referring to FIG. 1, there is shown a diagram depicting an exemplary architecture in which OFSense is deployed, in accordance with the invention. FIG. 2 shows a flow chart mapping the system architecture of FIG. 1.

The inventive OFSense is deployed as a control plane middleware located between OFS and the controller. Normal control messages (e.g., Packet_In and Flow_Mod) will pass through OFSense transparently, while duplicated packet traces will be intercepted by OFSense for local analysis, thereby reducing the overhead on the controller. Inside OFSense, there are five major components: application connectivity graph (ACG) construction (Procedure 1), network delay (ND) inference (Procedure 2), server delay (SD) estimation (Procedure 3), on-demand sensing (Scheduler) (Procedure 4), and an inference engine (Procedure 5). From the mapping part, an input of Packet_In messages in an OpenFlow network processed by the inventive OFSense core engine, of Procedures 1-5, provides an output of system management trouble tickets and Flow_Mod control messages.

Figure 3:
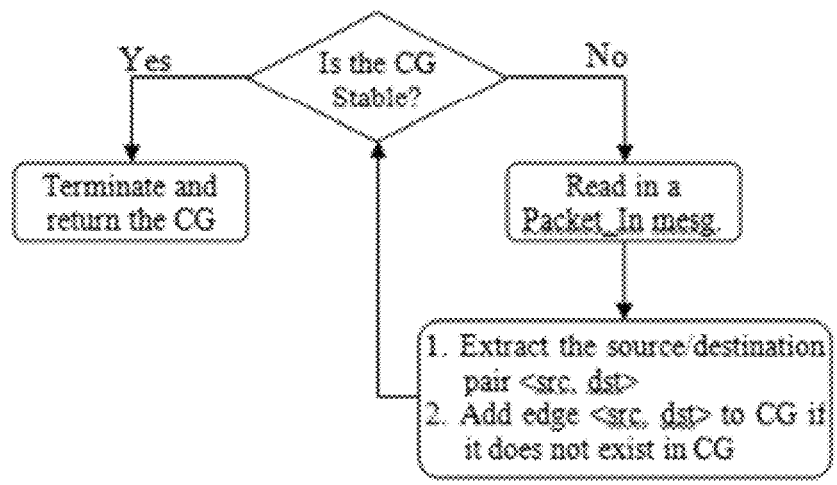
FIG. 3 shows a flow diagram for Procedure 1: ACG (Application Connectivity graph), depicted in FIG. 2.

Turning now to FIG. 3, showing a flow diagram for Procedure 1: ACG (Application connectivity Graph), which constructs an application connectivity graph leveraging OFS' Packet_In messages. The inventive OFSense checks if the application connectivity graph CG is stable. If the CG is stable the OFSense terminates Procedure 1 and returns the CG. If the CG is not stable OFSense reads in a Packet_In message and then: 1. Extracts the source destination pair <src, dst>, and 2. Adds edge <src, dst> to CG if it does not exist in CG. OFSense then checks if the CG is stable.

Figure 4:
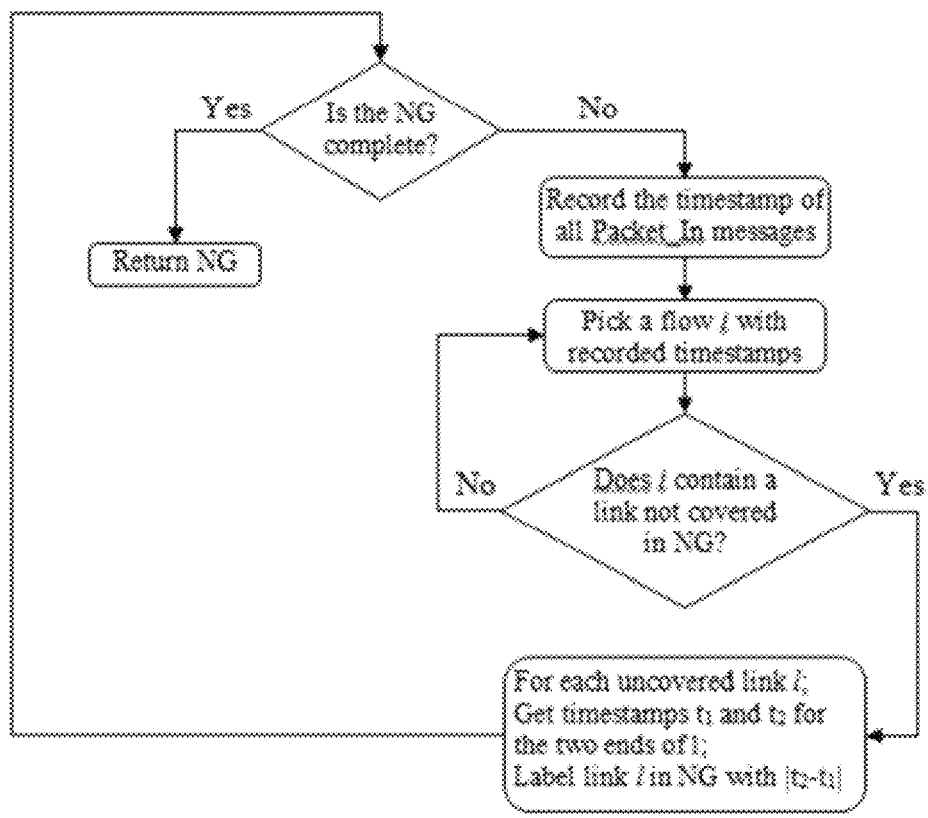
FIG. 4 shows a flow diagram for Procedure 2: ND (Network Delay), depicted in FIG. 2.

Turning now to FIG. 4, showing a flow diagram for Procedure 2: ND (Network Delay inference), which infers network delay for each link segment connecting two OpenFlow Switches. The inventive OFSense checks is the network graph NG is complete. The OfSense returns the NG if it is complete. If the NG is not complete the OFSense records the timestamp of all Packet_In messages and picks a flow i with recorded timestamps. If the flow i does not contain a link not covered in the NG then OFSense continues to pick a flow i with recorded timestamps. When the flow i does contain a link not covered in the NG, for each uncovered link l, timestamps $t_1$ and $t_2$ are attained for the two ends of l, and link l is labeled in the NG with $|t_1-t_2|$. The inventive OFSense then returns to the beginning of the flow and checks if the NG is complete.

Turning now to FIGS. 5, 6, showing preprocessing, and sequence matching steps, respectively, carried out by Procedure 3 (Server Delay estimation) of the inventive OFSense. The SD procedure estimates a server's application level response time. The first step in this procedure is data collections. OFSense performs this by setting the action to "duplicate and forward" in the Flow_Mod message sent to the server to be monitored. Then, a copy of all the following packets of this flow arriving into the switch will be forwarded to OFSense. Note that packet sequences of both the forward and backward directions are captured by OFSense. After this, there are four sequential steps to estimate the server response time.

The preprocessing, Procedure 3.1, entails removing TCP ACK and all "handshake" packets from both sequences and then consolidating packets transmitted back-to-back at line speed into a single response.

The SD procedure, Procedure 3 includes a request/response classification, Procedure 3.2. The goal of this step is to build a metric c that measures the correlation between a pair of request and response messages. Metric c falls into the range [0,1], in which value 0 suggests an uncorrelated message pair and 1 indicates exact correspondence. In practice, there are multiple ways to construct such a classifier—one can leverage existing protocol specific packet fingerprinting techniques or utilize machine learning based statistical approaches. This step is a customizable module in OFSense and can be decided by the network operator based on his or her preferences.

The sequence matching, procedure 3.3, is for determining the correspondence between elements in the request and response sequences. We first define a distance metric $d_{ij}$ for request i and response j:

$$d_{i,j} = \begin{cases} \infty & t_j - t_i \leq \tau \\ \sqrt{c^2 + r^2} & \text{otherwise,} \end{cases}$$

where tau is the RTT, $t_i$ and $t_j$ are respectively the timestamps of packets i and j, and $r=\tau/(t_j$ and $t_i)$.

For all i in the response sequence and all j in the response sequence, Procedure 3.3 calculates $d_{ij}$. For each packet in the request sequence, this procedure builds an ordered list of preferred responses based on distance $d_{ij}$. Procedure 3.3 outputs the optimal matching between requests and responses such that sqrt(sum$<_{i,j}>d^2_{ij}$) is minimized.

The SD procedure, Procedure 3 includes a server response time calculation, Procedure 3.4. Given the optimal matching output by Procedure 3.3, one can calculate the response time for all matched request/response pairs. OFSense calculates the mean and standard deviation, while many statistics can be obtained based on operator's preference.

Turning now to FIG. 7, there is shown a flow diagram for Procedure 4: Scheduler. Based on the latency graph LG already obtained and routing paths of all flows, the controller can perform back-to-back rule deletion/addition on a small set of flows that are sufficient to construct the remaining part of the latency graph. Finding the minimal set of flows can be reduced to finding the minimal path cover, which is a well-known NP-hard problem. To solve the problem, employs a simple greedy heuristic as shown in FIG. 7.

The LG, latency graph, is set as the current latency graph, PG the physical network topology, R as routes of all active flows. If the latency graph LG is equal to the physical network topology PG then the scheduler procedure is terminated. Otherwise, the scheduler sets Δ as the set of edges not covered in LG, finds a set of flows φ that covers the most links in Δ. For each i in φ, the scheduler deletes and adds rules for flow I at all switches in route $r_i$. The scheduler then Sets φ'=flows whose packet_in are received within interval tau; updates the latency graph LG; and updates the route set. The scheduler then returns to the flow beginning to check if LG is equal to PG as previously.

The inference procedure, Procedure 5, using the basic sensing mechanisms (i.e., Procedures 2-4), a spectrum of network inference tasks can be performed. Similar to Procedure 3.2, this procedure is customizable and can be flexibly configured by the operator.

Figure 8:
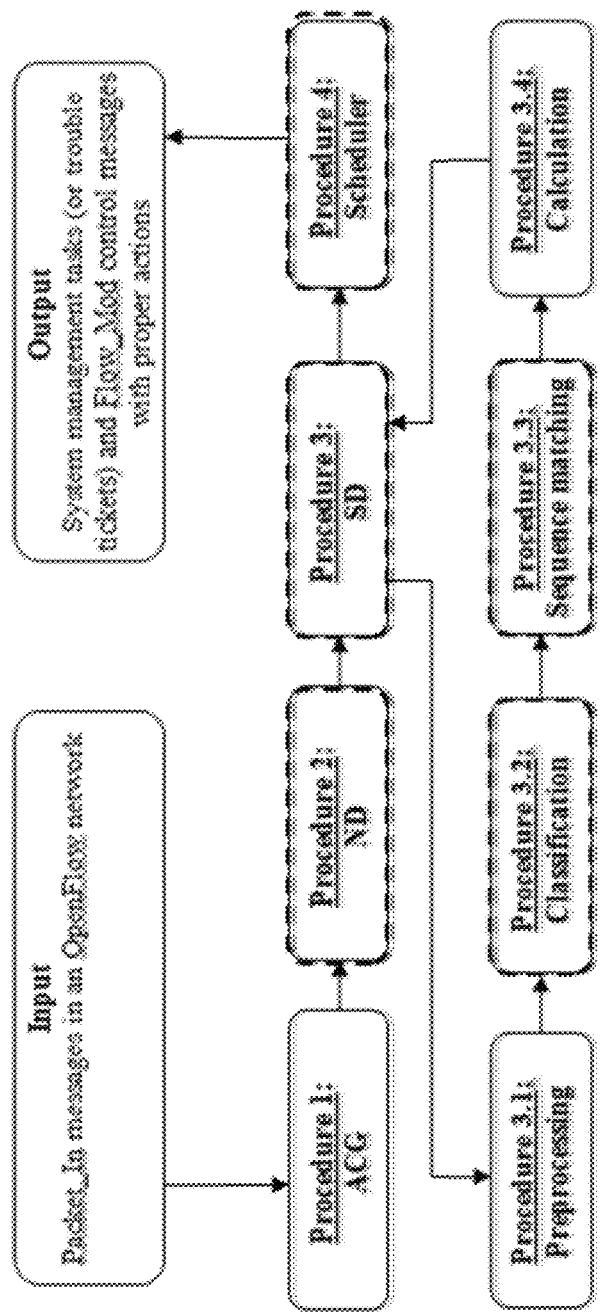
FIG. 8 shows an overview of Procedures noted in FIGS. 2-7 for the inventive OFSense.

The overview diagram of FIG. 8, highlights the unique aspects of the inventive OFSense detailed hereinabove. The application of OFS Packet_In events to infer a rich set of information is the most significant contribution of the invention. In particular, Procedure 2 is the first approach to measure network one-way delay without instrumentation or active probing. Procedure 3 also is the first approach to estimate the application response time of a designated server with only very lightweight passive network measurement. Procedure 4 allows on-demand sensing with minimal overhead and impact on existing applications.

From the foregoing it can be appreciated that the inventive OFSense offers very powerful network sensing capabilities via simple manipulation of OpenFlow's unique messaging mechanism. In addition to the great market potential for them as standalone products, OFS' sensing mechanisms allows for many value added services that can be built over OpenFlow switches and therefore are expected to significantly boost the sales and marketing of OpenFlow devices.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiment shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for determining the state of an entire network, including state of applications and infrastructure; said method comprising the steps:

receiving network control messages in a network;

passing normal network control messages through OFSense, a control plane middleware, and constructing from said network control messages an application level connectivity graph to infer network delay between any two communicating server in the network and estimating an application response time of a given server in the network; and providing state of the network for enabling intelligent detection and diagnosis of infrastructure and application performance, responsive to said passing step;

wherein said OFSense comprises a network delay procedure for inferring a network delay for each link segment connecting two switches of the network, said network delay procedure comprising:
  i) checking if a network graph NG is completed, returning the NG if it is complete,
  ii) if the NG is not completed, recording a timestamp of all Packet_In messages and picking a flow i with recorded timestamps,
  iii) if said flow i does not contain a link not covered in the NG then continue picking a flow i with recorded timestamps,
  iv) when the flow i does contain a link not covered in the NG, for each uncovered link l, timestamps $t_1$ and $t_2$ are attained for the two ends of l, and link l is labeled in the NG with $|t_1-t_2|$.

2. The method of claim 1, wherein said OFSense comprises measuring network one-way delay without instrumentation or active probing, estimating an application response time of a designated server with only very lightweight passive network measurement, and allowing on-demand sensing with minimal overhead and impact on existing applications in the network.

3. The method of claim 1, wherein said local analysis comprises a system evaluation trajectory enabling on-demand network sensing with minimal overhead and interference with existing applications in said network for providing a temporal view of the network.

4. The method of claim 1, wherein said OFSense comprises a server delay SD estimation procedure for estimating a server's application level response time, said SD estimation procedure including a request/response classification whose goal it is to build a metric c that measures the correlation between a pair of request and response messages, said metric c falling into a range [0,1], in which value 0 suggests an uncorrelated message pair and value 1 indicates exact correspondence.

5. The method of claim 4, wherein said request/response classification cab alternatively be constructed by leveraging existing protocol specific packet fingerprinting techniques or utilize machine learning based statistical approaches.

6. The method of claim 1, wherein said OFSense comprises a server delay SD estimation procedure for estimating a server's application level response time, said SD estimation procedure including a sequence matching procedure.

7. The method of claim 6, wherein said sequence matching procedure comprises determining the correspondence between elements in the request and response sequences there being defined a distance metric $d_{ij}$ for request i and response j:

$$d_{i,j} = \begin{cases} \infty & t_j - t_i \leq \tau \\ \sqrt{c^2 + r^2} & \text{otherwise,} \end{cases}$$

where tau is the RTT, $t_i$ and $t_j$ are respectively the timestamps of packets i and j, and $r=\text{tau}/(t_j \text{ and } t_i)$.

8. The method of claim 7, wherein said sequence matching procedure comprises:
  i) for all i in the response sequence and all j in the response sequence, calculate $d_{ij}$,
  ii) for each packet in the request sequence, build an ordered list of preferred responses based on distance $d_{ij}$,
  iii) output an optimal matching between requests and responses such that $\text{sqrt}(\text{sum}<_{i,j}>d^2_{ij})$ is minimized.

9. The method of claim 1, wherein said OFSense comprises a scheduler procedure, wherein based on a latency graph already obtained and routing paths of all flows, a controller can perform back-to-back rule deletion/addition on a small set of flows that are sufficient to construct a remaining part of the latency graph and finding a minimal set of flows can be reduced to finding a minimal path cover.

10. The method of claim 1, wherein said OFSense comprises a scheduler procedure comprising:
  i) setting a latency graph LG as a current latency graph, with PG being a physical network topology, and R as routes of all active flows;
  ii) If said latency graph LG is equal to said physical network topology PG then the scheduler procedure is terminated;
  iii) If said latency graph LG is not equal to said physical network topology PG the scheduler:
    a. sets Δ as the set of edges not covered in LG,
    b. finds a set of flows φ that covers the most links in Δ,
    c. for each i in φ, the scheduler deletes and adds rules for flow I at all switches in route $r_i$;
    d. the scheduler sets φ'=flows whose packet_in are received within interval tau; updates the latency graph LG; and updates the route set; and
  iv) the scheduler then returns to the flow beginning to check if LG is equal to PG as previously.

11. A method for determining the state of an entire network, including state of applications and infrastructure; said method comprising the steps:
  receiving network control messages in a network;
  passing normal network control messages through OFSense, a control plane middleware, and constructing from said network control messages an application level connectivity graph to infer network delay between any two communicating server in the network and estimating an application response time of a given server in the network; and
  providing state of the network for enabling intelligent detection and diagnosis of infrastructure and application performance, responsive to said passing step,
  wherein said OFSense comprises a server delay SD estimation procedure for estimating a server's application level response time, said SD estimation procedure including a request/response classification whose goal it is to build a metric c that measures the correlation between a pair of request and response messages, said metric c falling into a range [0,1], in which value 0 suggests an uncorrelated message pair and value 1 indicates exact correspondence.

12. A method for determining the state of an entire network, including state of applications and infrastructure; said method comprising the steps:
  receiving network control messages in a network;
  passing normal network control messages through OFSense, a control plane middleware, and constructing from said network control messages an application level connectivity graph to infer network delay between any two communicating server in the network and estimating an application response time of a given server in the network; and providing state of the network for enabling intelligent detection and diagnosis of infrastructure and application performance, responsive to said passing step wherein said sequence matching procedure comprises determining the correspondence between elements in the request and response sequences there being defined a distance metric $d_{ij}$ for request i and response j:

$$d_{i,j} = \begin{cases} \infty & t_j - t_i \leq \tau \\ \sqrt{c^2 + r^2} & \text{otherwise,} \end{cases}$$

where tau is the RTT, $t_i$ and $t_j$ are respectively the timestamps of packets i and j, and r=tau/($t_j$ and $t_i$).

* * * * *